United States Patent
Satoh (10) Patent No.: US 8,330,893 B2
(45) Date of Patent: Dec. 11, 2012

(54) ACTIVE MATRIX SUBSTRATE AND DISPLAY DEVICE EQUIPPED WITH THE SAME

(75) Inventor: Masakazu Satoh, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 387 days.

(21) Appl. No.: 12/447,744

(22) PCT Filed: Jul. 23, 2007

(86) PCT No.: PCT/JP2007/064417
§ 371 (c)(1),
(2), (4) Date: Apr. 29, 2009

(87) PCT Pub. No.: WO2008/078426
PCT Pub. Date: Jul. 3, 2008

(65) Prior Publication Data
US 2010/0073587 A1    Mar. 25, 2010

(30) Foreign Application Priority Data
Dec. 22, 2006    (JP) .................................. 2006-346523

(51) Int. Cl.
*G02F 1/1333* (2006.01)
(52) U.S. Cl. ........................................................ 349/59
(58) Field of Classification Search .................... 349/40, 349/58–59
See application file for complete search history.

(56) References Cited

U.S. PATENT DOCUMENTS

| | | | |
|---|---|---|---|
| 5,019,002 A | | 5/1991 | Holmberg |
| 5,313,319 A | * | 5/1994 | Salisbury ........................ 349/40 |
| 5,760,855 A | | 6/1998 | Nakase et al. |
| 5,930,607 A | | 7/1999 | Satou |
| 7,573,541 B2 | * | 8/2009 | Kim ................................. 349/59 |
| 7,742,140 B2 | * | 6/2010 | Lee et al. ....................... 349/149 |
| 2002/0088978 A1 | | 7/2002 | Trainor et al. |
| 2004/0218108 A1 | | 11/2004 | Ko et al. |
| 2006/0017672 A1 | | 1/2006 | Aoki |

FOREIGN PATENT DOCUMENTS

| | | |
|---|---|---|
| JP | 63-021623 | 1/1988 |
| JP | 4-67168 | 10/1992 |
| JP | 11-095253 | 4/1999 |

OTHER PUBLICATIONS

International Search Report for PCT/JP2007/064417 mailed Sep. 25, 2007.

* cited by examiner

*Primary Examiner* — Eric Wong
(74) *Attorney, Agent, or Firm* — Nixon & Vanderhye P.C.

(57) ABSTRACT

An active matrix substrate (20a) defining a display region (D) which contributes to display and a frame region (F) which is arranged outside the display region (D) and does not contribute to display, the active matrix substrate (20a) comprising: a grounding wire (23) extending along a circumference of the frame region (F) in the frame region (F), wherein a gate electrode line (14b), part of which overlapping the grounding wire (23) constitutes an electrostatic protection element (25), is arranged in part of the frame region (F) outside the grounding wire (23).

9 Claims, 5 Drawing Sheets

ACTIVE MATRIX SUBSTRATE AND DISPLAY DEVICE EQUIPPED WITH THE SAME

This application is the U.S. national phase of International Application No. PCT/JP2007/064417 filed 23 Jul. 2007 which designated the U.S. and claims priority to Japanese Patent Application No. 2006-346523 filed 22 Dec. 2006, the entire contents of each of which are hereby incorporated by reference.

TECHNICAL FIELD

The present disclosure relates to an active matrix substrate and a display device equipped with the same, particularly to a technology of manufacturing active-matrix-drive liquid crystal display panels.

BACKGROUND ART

An active-matrix-drive liquid crystal display panel includes an active matrix substrate on which a plurality of pixel electrodes are arranged in a matrix pattern, a counter substrate arranged to face the active matrix substrate and has a common electrode, and a liquid crystal layer inserted between the active matrix substrate and the counter substrate.

In manufacturing the active matrix substrate, for example, forming discharge projections or electrostatic protection elements in common wires arranged in the periphery of the active matrix substrate to input a common signal to a common electrode on the counter substrate has widely been known as measures to avoid ESD (electrostatic discharge) that occurs in the manufacturing process due to, for example, charge generated in the step of etching a conductive film into wires or electrodes, and static charge generated in the step of rubbing an alignment film (e.g., see Patent Documents 1-3). According to this, even if static charge is generated in the panel, the discharge projections function as a lightning conductor. Therefore, drive circuits (drivers) for driving the liquid crystal display panel and various conductive elements in the pixels are less likely to be affected by static electricity.

Patent Document 1: Japanese Patent Publication No. H4-67168
Patent Document 2: Published Japanese Patent Application No. S63-21623
Patent Document 3: Published Japanese Patent Application No. H11-95253

DISCLOSURE OF THE INVENTION

Problem that the Invention is to Solve

Figure 8:
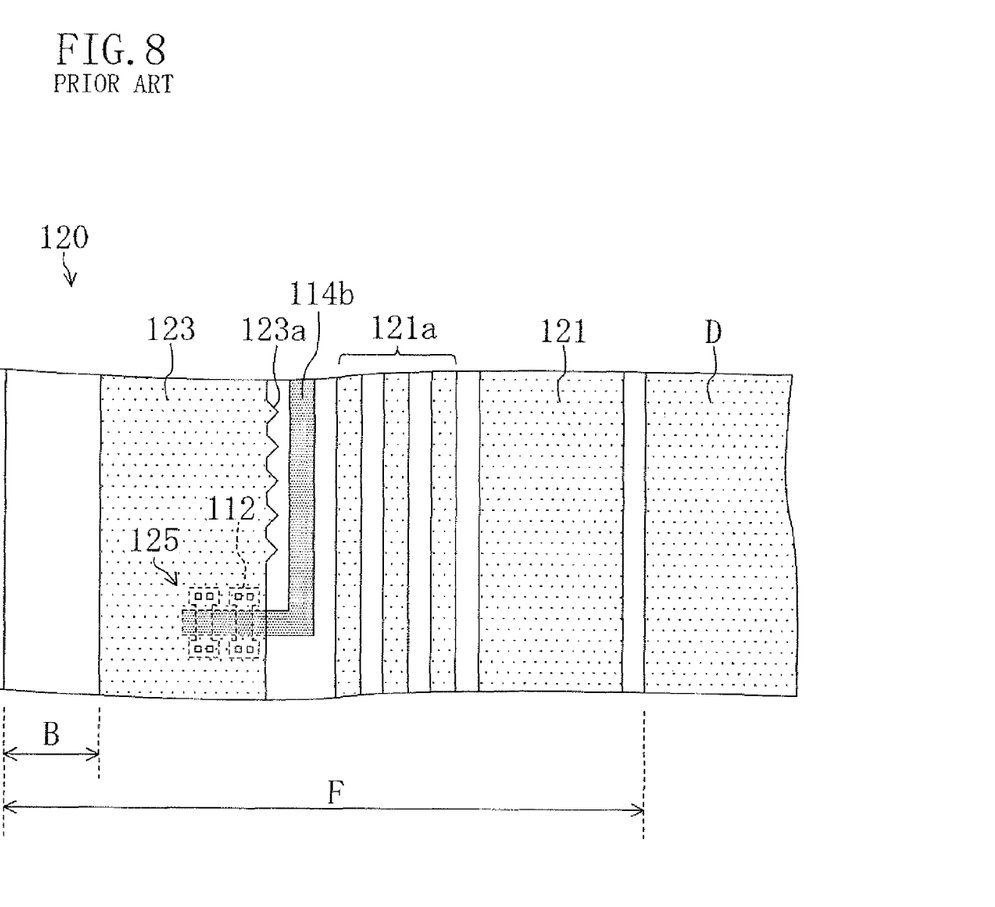
FIG. 8 is a plan view illustrating a frame region F of a conventional active matrix substrate 120.

FIG. 8 is a plan view partially illustrating a conventional active matrix substrate 120 configured to avoid ESD.

On the active matrix substrate 120, a rectangular display region D lies on the right side of FIG. 8, and a frame region F in the shape of a frame is formed around the display region D. As shown in FIG. 8, the frame region F includes, from the side close to the display region D (the right side), a monolithic driver circuit 121, a signal wire 121a to be connected to an external input terminal, a gate electrode line 114b constituting an electrostatic protection element 125, and a common wire 123 having a common transition portion to be connected to a common electrode of the counter substrate. The frame region F further includes, on the left side of the common wire 123, a buffer region B in which effective circuits are not arranged so that the display region D is not affected by corrosion and break. As shown in FIG. 8, the common wire 123 has a plurality of discharge projections 123a projecting toward the gate electrode line 114b. Further, electrostatic protection elements 125, each of which is in the shape of a diode, are formed in part of the common wire 123 overlapping the gate electrode line 114b. Therefore, in manufacturing the active matrix substrate 120, when the amount of charge accumulated in the gate electrode line 114b exceeds a predetermined level due to charge generated in the etching step and static charge generated in the rubbing step, the charge is emitted to the grounded common wire 123 through a semiconductor layer 112 of the electrostatic protection element 125, or emitted by small discharge that occurs at the pointed ends of the discharge projections 123a.

In recent years, narrowing the peripheral frame region which does not contribute to display has been longed for in the liquid crystal display panels for use in mobile devices, particularly in cellular phones. However, in the conventional liquid crystal display panel (the active matrix substrate 120), the elements for avoiding ESD are arranged in the frame region as described above with reference to FIG. 8. Thus, it is difficult to achieve both avoiding ESD and narrowing the frame region.

In view of the foregoing, the present invention was developed. An object of the invention is to achieve both avoiding ESD and narrowing the frame region.

Means of Solving the Problem

In order to achieve the object, according to the present invention, a gate electrode line, part of which overlapping the grounding wire constitutes an electrostatic protection element, is arranged in part of the frame region outside the grounding wire.

Specifically, an active matrix substrate of the present invention is an active matrix substrate defining a display region which contributes to display and a frame region which is arranged outside the display region and does not contribute to the display, the active matrix substrate including: a grounding wire extending along a circumference of the frame region in the frame region, wherein a gate electrode line, part of which overlapping the grounding wire constitutes an electrostatic protection element, is arranged in part of the frame region outside the grounding wire.

According to the above-described structure, the gate electrode line constituting the electrostatic protection element is arranged in part of the frame region outside the grounding wire. Therefore, the width of the frame region can be reduced as compared with the case where the gate electrode line is arranged in part of the frame region inside the grounding wire (see the active matrix substrate 120 in FIG. 8). In the periphery of the active material substrate, i.e., in part of the frame region outside the grounding wire, effective circuits which contribute to display such as drive circuits are not arranged so that the display region is not affected by corrosion and/or break, but the electrostatic protection element which does not contribute to display and avoids ESD that may occur in the manufacturing process and the gate electrode line constituting the electrostatic protection element are effectively arranged. When the amount of charge accumulated in the gate electrode line exceeds a predetermined level in manufacturing the active matrix substrate due to, for example, charge generated in the etching step and static charge generated in the rubbing step, the charge is emitted to the grounding wire through the electrostatic protection element, and therefore ESD can be avoided. Thus, both avoiding ESD and narrowing the frame region can be achieved.

The electrostatic protection element may be configured so that the grounding wire and the gate electrode line may be electrically connectable through a semiconductor layer.

In the above-described structure, when the amount of charge accumulated in the gate electrode line exceeds a predetermined level in manufacturing the active matrix substrate due to, for example, charge generated in the etching step and static charge generated in the rubbing step, the charge is emitted to the grounding wire through the semiconductor layer of the electrostatic protection element.

The grounding wire may be electrically connected to a common electrode of a counter substrate arranged to face the active matrix substrate.

In the above-described structure, the grounding wire functions as a wire for electrical connection with the common electrode of the counter substrate. Thus, the advantages of present invention are proved to be effective.

The grounding wire may have a discharge projection projecting toward the gate electrode line.

In the above-described structure, when the amount of charge accumulated in the gate electrode line exceeds a predetermined level in manufacturing the active matrix substrate due to, for example, charge generated in the etching step and static charge generated in the rubbing step, the charge is emitted by discharge that occurs at a pointed end of the discharge projection of the grounding wire.

The gate electrode line may have a discharge projection projecting toward the grounding wire.

In the above-described structure, when the amount of charge accumulated in the gate electrode line exceeds a predetermined level in manufacturing the active matrix substrate due to, for example, charge generated in the etching step and static charge generated in the rubbing step, the charge is emitted by discharge that occurs at a pointed end of the discharge projection of the gate electrode line.

A driver circuit may be arranged in part of the frame region on the side of the grounding wire close to the display region.

In the above-described structure, the gate electrode line is arranged in part of the frame region outside the grounding wire. Therefore, a distance between the gate electrode line constituting the electrostatic protection element and the driver circuit is increased as compared with the case where the gate electrode line is arranged in part of the frame region inside the grounding wire (see the active matrix substrate 120 of FIG. 8). Thus, the driver circuit is less likely to be affected by the static charge.

The part of the frame region outside the grounding wire may be a buffer region which prevents the display region from being affected by corrosion and/or break.

In the above-described structure, the part of the frame region outside the grounding wire is used as a buffer region in which effective circuits which contribute to display such as drive circuits are not arranged, but the electrostatic protection element which does not contribute to display and avoids ESD that may occur in the manufacturing process and the gate electrode line constituting the electrostatic protection element are effectively arranged. Therefore, the frame region can be used effectively, and the advantages of the present invention are proved to be effective.

A display panel of the present invention includes: an active matrix substrate; a counter substrate which is arranged to face the active matrix substrate and has a common electrode; and a display layer inserted between the active matrix substrate and the counter substrate, the active matrix substrate including a grounding wire extending along a circumference of the frame region and electrically connected to the common electrode of the counter substrate, and the display panel defining a display region which contributes to display and a frame region which is arranged outside the display region and does not contribute to display, wherein a gate electrode line, part of which overlapping the grounding wire constitutes an electrostatic protection element, is arranged in part of the frame region outside the grounding wire.

In the above-described structure, the gate electrode line constituting the electrostatic protection element is arranged in part of the frame region outside the grounding wire. Therefore, the width of the frame region can be reduced as compared with the case where the gate electrode line is arranged in part of the frame region inside the grounding wire (see the active matrix substrate 120 in FIG. 8). In the periphery of the active material substrate, i.e., in part of the frame region outside the grounding wire, effective circuits which contribute to display such as drive circuits are not arranged so that the display region is not affected by corrosion and/or break, but the electrostatic protection element which does not contribute to display and avoids ESD that may occur in the manufacturing process and the gate electrode line constituting the electrostatic protection element are effectively arranged. When the amount of charge accumulated in the gate electrode line exceeds a predetermined level in manufacturing the active matrix substrate due to, for example, charge generated in the etching step and static charge generated in the rubbing step, the charge is emitted to the grounding wire through the electrostatic protection element, and therefore ESD can be avoided. Thus, both avoiding ESD and narrowing the frame region can be achieved.

Effect of the Invention

According to the present invention, the gate electrode line, part of which overlapping the grounding wire constitutes the electrostatic protection element, is arranged in part of the frame region outside the grounding wire. This allows both avoiding ESD and narrowing the frame region.

BRIEF DESCRIPTION OF DRAWINGS

FIG. 5 is a sectional view illustrating a TFT 5 of the active matrix substrate 20a.

EXPLANATION OF REFERENCE NUMERALS

B Buffer region
D Display region
F Frame region
12a Semiconductor layer
14b Gate electrode line 14ba Discharge projection
20a-20c Active matrix substrate
21 Gate driver (driver circuit)
23 Grounding wire
23a Discharge projection
25 Electrostatic protection element
30 Counter substrate
31 Common electrode
35 Liquid crystal layer (display layer)
50 Liquid crystal display panel

BEST MODE FOR CARRYING OUT THE INVENTION

Hereinafter, embodiments of the present invention will be described in detail with reference to the accompanying drawings. However, the present invention is not limited to the embodiments described below.

Embodiment 1

Figure 1:
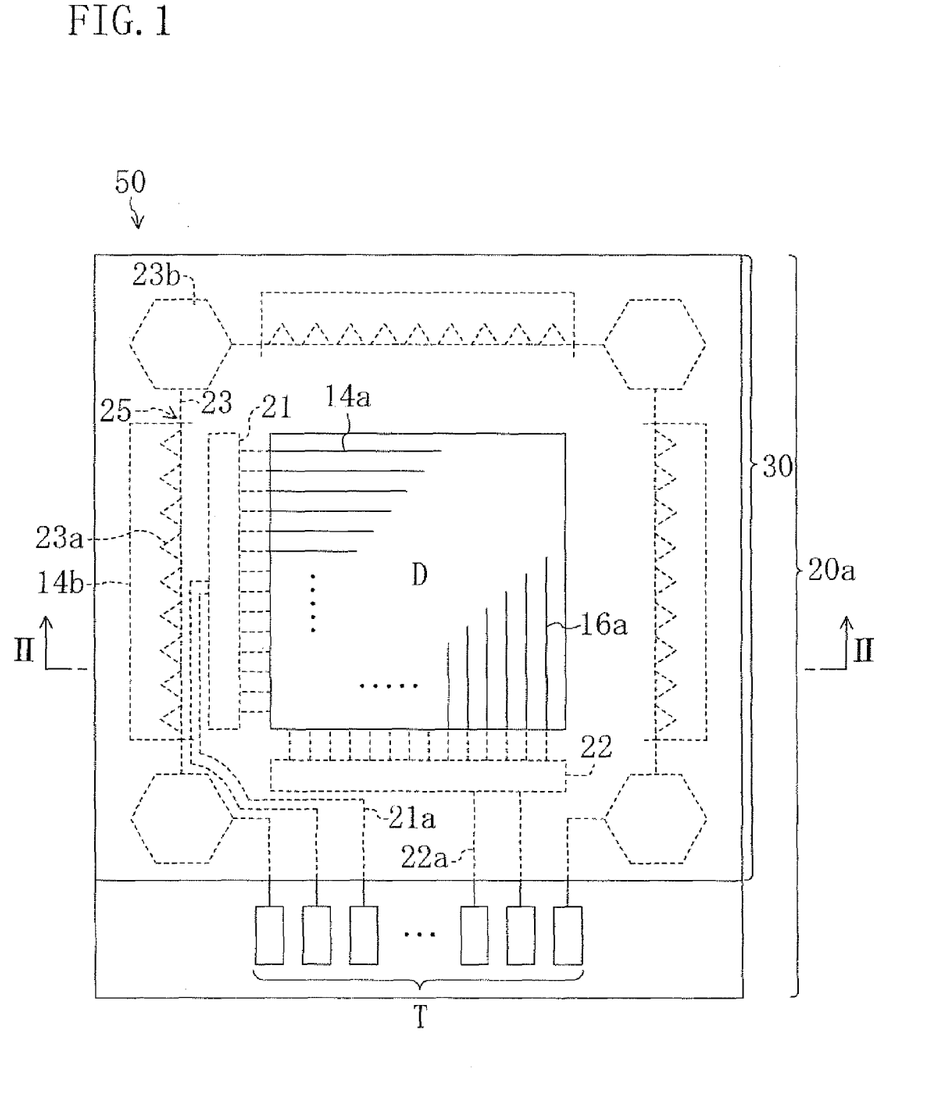
FIG. 1 is a plan view of a liquid crystal display panel 50 according to Embodiment 1.
Figure 2:
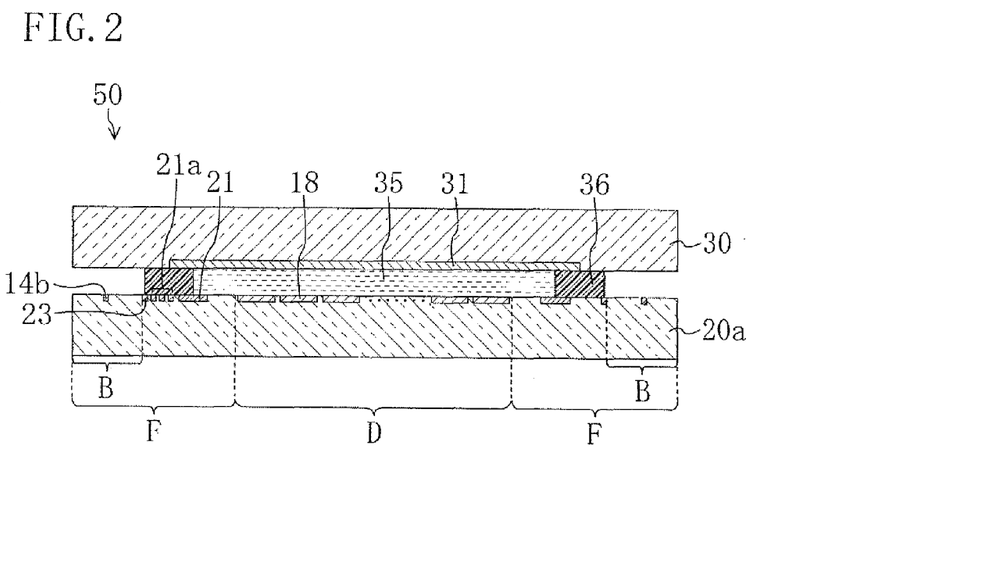
FIG. 2 is a sectional view of the liquid crystal panel 50 taken along the line II-II in FIG. 1.
Figure 3:
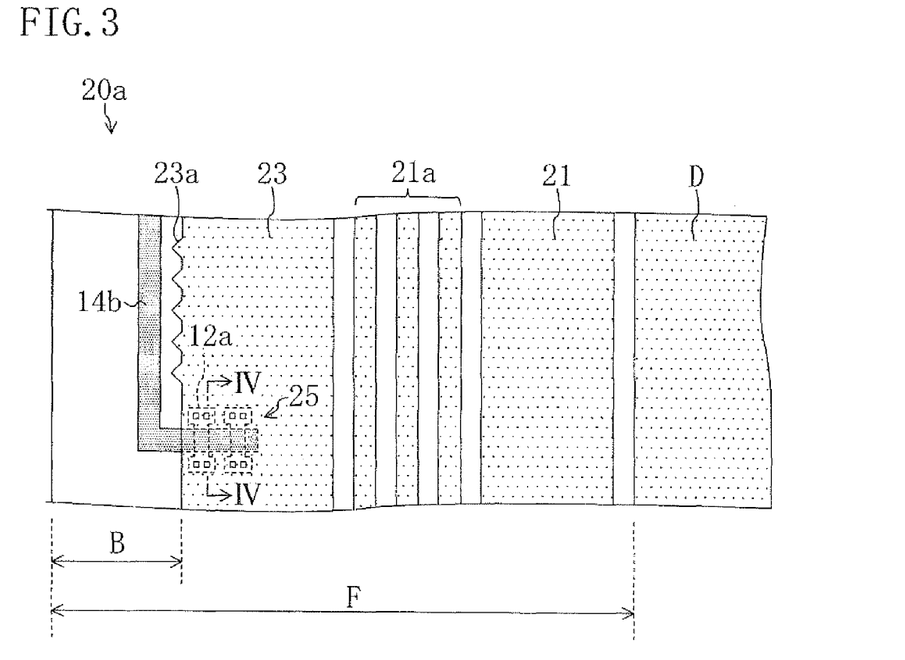
FIG. 3 is a plan view illustrating a frame region F of an active matrix substrate 20a constituting the liquid crystal display panel 50.

FIGS. 1-5 illustrate an active matrix substrate and a display panel equipped with the active matrix substrate according to Embodiment 1 of the present invention. In this embodiment, an active-matrix-drive liquid crystal display panel is taken as an example of the display panel. FIG. 1 is a plan view of a liquid crystal display panel 50 of the present embodiment, and FIG. 2 is a sectional view of the liquid crystal display panel 50 taken along the line II-II in FIG. 1. FIG. 3 is a plan view illustrating a frame region F of an active matrix substrate 20a constituting the liquid crystal display panel 50.

The liquid crystal display panel 50 includes, as shown in FIGS. 1 and 2, an active matrix substrate 20a and a counter substrate 30 arranged to face each other, and a liquid crystal layer 35 inserted as a display layer between the active matrix substrate 20a and the counter substrate 30. The liquid crystal display panel 50 defines a display region D which contributes to display and a frame region F which is arranged to surround the display region D and does not contribute to display.

As shown in FIGS. 1 and 2, the active matrix substrate 20a includes, in the display region D, a plurality of gate lines 14a extending parallel to each other, a plurality of source lines 16a extending parallel to each other in the direction orthogonal to the gate lines 14a, a plurality of thin-film transistors 5 (hereinafter referred to as TFTs, see FIG. 5) arranged at the intersections of the gate lines 14a and the source lines 16a, respectively, and a plurality of pixel electrodes 18 corresponding to the TFTs 5, respectively. Each of the pixel electrodes 18 constitutes a pixel, a minimum unit of an image. The pixels are arranged in a matrix pattern to constitute the display region D. An alignment film 19 (see FIG. 5) which has been rubbed is formed on the surface of the active matrix substrate 20a to cover the pixel electrodes 18.

Figure 5:
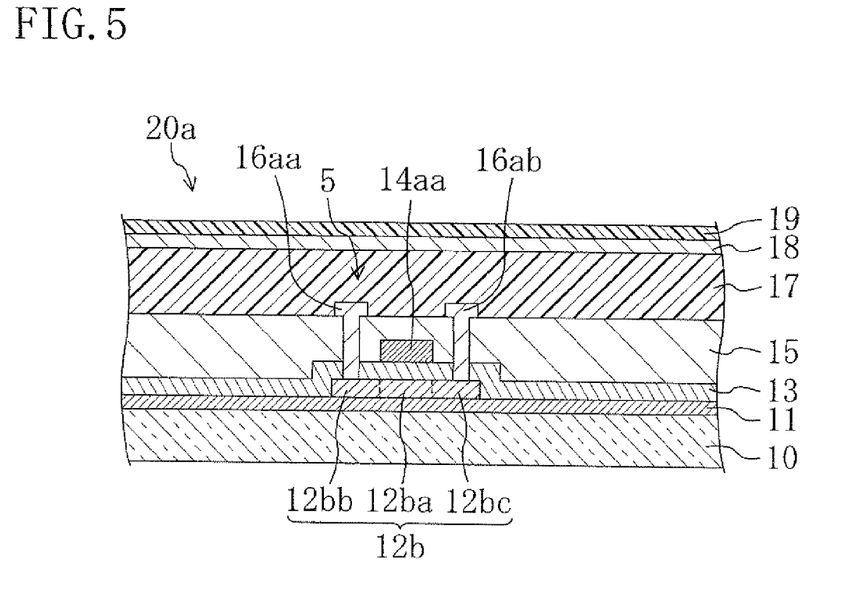

The TFT 5 includes, as shown in FIG. 5, a semiconductor layer 12b formed on an insulating substrate 10 with a base coat film 11 interposed therebetween, a gate insulating film 13 formed to cover the semiconductor layer 12b, and a gate electrode 14aa formed on the gate insulating film 13. The TFT 5 is a top-gate TFT.

The semiconductor layer 12b includes, as shown in FIG. 5, a channel region 12ba arranged to overlap the gate electrode 14aa, and a source region 12bb and a drain region 12bc arranged on the sides of the channel region 12ba. The gate electrode 14aa is a portion of the gate line 14a projecting in the lateral direction to each of the pixels. To the source region 12bb, a source electrode 16aa which is a portion of the source line 16a projecting in the lateral direction to each of the pixels is electrically connected through a contact hole formed in a layered film of the gate insulating film 13 and an interlayer insulating film 15. To the drain region 12bc, a drain electrode 16ab is electrically connected through a contact hole formed in the layered film of the gate insulating film 13 and the interlayer insulating film 15. A resin layer 17 is formed on the source electrode 16aa and the drain electrode 16ab. The drain electrode 16ab is electrically connected to the pixel electrode 18 through a contact hole (not shown) formed in the resin layer 17.

As shown in FIGS. 1 to 3, the active matrix substrate 20a includes, in the frame region F, a gate driver 21 for supplying gate signals to the gate lines 14a, a source driver 22 for supplying source signals to the source lines 16a, a grounding wire 23 arranged outside the gate driver 21 and the source driver 22 to function as a common wire for supplying a common signal to a common electrode 31 of a counter substrate 30 to be described later, and a plurality of input terminals T for inputting signals to the gate driver 21 and the source driver 22 through signals lines 21a and 22a, respectively, and to the grounding wire 23. The gate driver 21 and the source driver 22 may be constituted of monolithic ICs (monolithic Integrated circuits), i.e., ICs formed simultaneously with the TFTs 5 of the pixels. Alternatively, they may be constituted of COG (chip on glass) ICs, i.e., mounted IC chips.

The grounding wire 23 includes, as shown in FIG. 1, common transition portions 23b provided at corners, respectively, to be connected to the common electrode 31 of the counter substrate 30, linear segments arranged between the common transition portions 23b, and a plurality of discharge projections 23a which project outwardly from each of the linear segments (toward a gate electrode line 14b to be described later) and cause small discharge at pointed ends thereof.

As shown in FIGS. 1 to 3, the active matrix substrate 20a includes, in a buffer region B in the periphery of the frame region F, a gate electrode line 14b which is bent inwardly (toward the display region D) at both ends so that the ends overlap the grounding wire 23. At each of the ends of the gate electrode line 14b overlapping the grounding wire 23, two electrostatic protection elements 25 are arranged as shown in FIG. 3.

Figure 4:
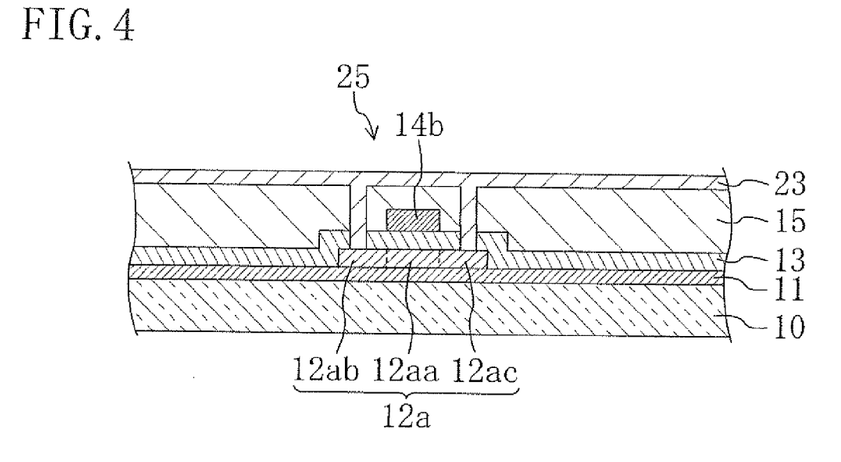
FIG. 4 is a sectional view of an electrostatic protection element 25 taken along the line IV-IV in FIG. 3.

FIG. 4 is a sectional view of the electrostatic protection element 25 taken along the line IV-IV in FIG. 3.

The electrostatic protection element 25 is constituted of, as shown in FIGS. 3 and 4, the semiconductor layer 12a formed on the insulating substrate 10 with the base coat film 11 interposed therebetween, the gate insulating film 13 formed to cover the semiconductor layer 12a, the gate electrode line 14b formed on the gate insulating film 13 to intersect with the semiconductor layer 12a, the interlayer insulating film 15 formed to cover the gate electrode line 14b, and the grounding wire 23 electrically connected to the semiconductor layer 12a through a contact hole formed in a layered film of the gate insulating film 13 and the interlayer insulating film 15. The semiconductor layer 12a includes a high resistance region 12aa overlapping the gate electrode line 14b, and low resistance regions 12ab and 12ac formed on the sides of the high resistance region 12aa.

When the amount of charge accumulated in the gate electrode line 14h exceeds a predetermined level in manufacturing the active matrix substrate 20a due to, for example, charge generated in the etching step and static charge generated in the rubbing step, the electrostatic protection element 25 allows emitting the charge to the grounding wire 23 through the semiconductor layer 12a. That is, the electrostatic protection element 25 functions as a semiconductor diode capable of avoiding ESD.

As shown in FIG. 2, the counter substrate 30 includes a color filter layer (not shown) and a common electrode 31 formed on the color filter layer. The color filter layer includes a plurality of colored layers (not shown), for example, colored in red, green and blue, corresponding to the pixel electrodes 18 on the active matrix substrate 20a, respectively, and a black matrix (not shown) formed between the colored layers. An alignment film (not shown) which has been rubbed is formed on the surface of the counter substrate 30 to cover the common electrode 31.

The liquid crystal layer 35 is constituted of nematic liquid crystal having an electrooptic characteristic.

In the liquid crystal display panel 50 thus configured, a predetermined charge is written in the pixel electrode 18 through the TFT 5 when a gate signal from the gate driver 21 is sent through the gate line 14a to turn the TFT 5 on, and a source signal from the source driver 22 is sent through the source line 16a in each of the pixels. Further, as a common signal is sent to the common electrode 31 through the grounding wire 23, the pixel electrode 18 and the common electrode 31 vary in potential. As a result, a predetermined voltage is applied to a liquid crystal capacity constituted of the liquid crystal layer 35. The liquid crystal display panel 50 adjusts transmittance of light coming from the outside by making use of change in orientation of the liquid crystal layer 35 in response to the voltage applied to the liquid crystal layer 35. Thus, an image is displayed on the display panel 50.

A method for manufacturing the aforementioned liquid crystal display panel 50 will be described with reference to FIGS. 1 to 4. The manufacturing method of the present embodiment includes an active matrix substrate fabrication process, a counter substrate fabrication process, and a liquid crystal layer fabrication process.

(Active Matrix Substrate Fabrication Process)

A silicon oxide film (about 100 nm in thickness), for example, is deposited on the whole surface of an insulating substrate 10 made of glass or other material by plasma CVD (Chemical Vapor Deposition) to form a base coat film 11.

Then, an amorphous silicon film (about 50 nm in thickness) is deposited on the whole surface of the base coat film 11 by plasma CVD. The amorphous silicon film is then crystallized by laser annealing (converted to a polysilicon film), and patterned into semiconductor layers 12a and 12b by photolithography.

On the whole surface of the base coat film 11 on which the semiconductor layers 12a and 12b have been formed, a silicon oxide film (about 100 nm in thickness), for example, is deposited by plasma CVD to form a gate insulating film 13.

On the whole surface of the gate insulating film 13, a tantalum nitride film (about 50 nm in thickness) and a tungsten film (about 350 nm in thickness), for example, are deposited in this order by sputtering, and then patterned into gate lines 14a, gate electrodes 14aa and gate electrode lines 14b by photolithography.

Then, using the gate electrode 14aa and the gate electrode line 14b as a mask, phosphorus is doped into the semiconductor layers 12a and 12b through the gate insulating film 13 to form a channel region 12ba overlapping the gate electrode 14aa, a source region 12bb and a drain region 12bc on the outside of the channel region 12ba, a high resistance region 12aa overlapping the gate electrode line 14b, and low resistance regions 12ab and 12ac on the outside of the high resistance region 12aa. A thermal treatment is then performed to activate the phosphorus dopant. Doping with phosphorus as an impurity element as described above allows formation of an N-channel TFT, and doping with boron allows formation of a P-channel TFT.

On the whole surface of the gate insulating film 13 on which the gate line 14a, the gate electrode 14aa and the gate electrode line 14b have been formed, a silicon nitride film (about 500 nm in thickness) and a silicon oxide film (about 500 nm in thickness), for example, are deposited in this order by plasma CVD to form an interlayer insulating film 15.

Then, the layered film of the gate insulating film 13 and the interlayer insulating film 15 is partially removed by etching to form contact holes corresponding to the low resistance regions 12ab and 12ac of the semiconductor layer 12a, and the source region 12bb and the drain region 12bc of the semiconductor layer 12b.

On the whole surface of the interlayer insulating film 15, a titanium film (about 100 nm in thickness), an aluminum film (about 500 nm in thickness) and a titanium film (about 100 nm in thickness), for example, are deposited in this order by sputtering, and patterned into source lines 16a, source electrodes 16aa, drain electrodes 16ab, grounding wires 23, discharge projections 23a and common transition portions 23b by photolithography. In this way, the TFT 5 and the electrostatic protection element 25 are formed, and the gate driver 21 and the source driver 22 are formed.

Then, on the whole surface of the interlayer insulating film 15 on which the source lines 16a, the source electrodes 16aa, the drain electrodes 16ab, the grounding wires 23, the discharge projections 23a and the common transition portions 23b have been formed, an acrylic resin (2-3 μm in thickness), for example, is coated to form a resin layer 17.

Subsequently, part of the resin layer 17 corresponding to the drain electrode 16ab is removed by etching to form a contact hole.

An ITO (Indium Tin Oxide) film (about 100 nm in thickness), for example, is deposited by sputtering on the whole surface of the resin layer 17, and patterned into pixel electrodes 18 by photolithography.

A thermal treatment is then performed to terminate dangling bonds (uncombined bonds) of the semiconductor layers 12a and 12b.

Finally, a polyimide resin film, for example, is formed by printing, and rubbed to form an alignment film 19.

In this way, the active matrix substrate 20a can be fabricated. When the amount of charge accumulated in the gate electrode line 14b exceeds a predetermined level due to, for example, charge generated in the etching step for photolithography and static charge generated in the rubbing step, the accumulated charge is emitted to the grounding wire 23 through the semiconductor layer 12a of the electrostatic protection element 25. Further, when a small amount of charge is accumulated in the grounding wire 23, the charge can be emitted by small discharge that occurs at the pointed end of the discharge projection 23a. The grounding wire 23 is configured to be grounded at least during the active matrix substrate fabrication process.

(Counter Substrate Fabrication Process)

First, a black photosensitive resin (about 1 μm in thickness), for example, is formed on an insulating substrate made of glass or other material, and patterned to form a black matrix.

Then, red, green and blue colored layers (about 2 μm in thickness) are formed in spaces in the lattice of the black matrix by patterning to form a color filter layer.

Then, an ITO film (about 100 nm in thickness) is deposited on the color filter layer to form a common electrode 31.

Finally, a polyimide resin film, for example, is formed by printing, and rubbed to form an alignment film.

In this way, the counter substrate 30 can be fabricated.

(Liquid Crystal Layer Fabrication Process)

First, on the active matrix substrate 20a fabricated in the active matrix substrate fabrication process described above, a frame-shaped sealant 36 made of a thermosetting resin is formed by printing, and conductive paste is applied onto the common transition portions 23b of the active matrix substrate 20a.

Then, spherical spacers made of plastic or other material are spread on the active matrix substrate 20a provided with the sealant 36. In the present embodiment, the spacers are spherical spacers made of plastic or other material. However, the spacers may be formed by patterning of a photosensitive resin.

The active matrix substrate 20a on which the spacers have been spread is bonded to the counter substrate 30 fabricated in the counter substrate fabrication process. In this step, the common transition portions 23b on the active matrix substrate 20a and the common electrode 31 on the counter substrate 30 are electrically connected through the conductive paste (not shown). In the present embodiment, the conductive paste is applied to the common transition portions 23b so that the common transition portions 23b and the common electrode 31 are electrically connected through the conductive paste. However, conductive particles, such as gold beads, may be contained in the sealant 36 so that the common transition portions 23b and the common electrode 31 are electrically connected through the conductive particles.

After the sealant 36 is cured by heating, liquid crystal material is injected between the active matrix substrate 20a and the counter substrate 30 by dipping method.

Finally, the sealant 36 is blocked with a UV curing resin or other material to form a liquid crystal layer 35.

In this way, the liquid crystal display panel 50 can be fabricated.

According to the method for manufacturing the liquid crystal display panel of the present embodiment, the glass substrates facing each other are bonded together with the sealant. Then, the sealant is cured, and the liquid crystal material is injected. However, the liquid crystal display panel may be fabricated by providing the sealant first on the glass substrate, dropping the liquid crystal material, bonding the glass substrates and then curing the sealant.

As described above, in the active matrix substrate 20a and the liquid crystal display panel 50 of the present embodiment, the gate electrode line 14b constituting the electrostatic protection element 25 is arranged in part of the frame region F outside the grounding wire 23. Therefore, the width of the frame region F can be reduced as compared with the case where the gate electrode line 114b is arranged in part of the frame region F inside the common wire 123 (see the active matrix substrate 120 of FIG. 8). In the periphery of the active matrix substrate 20a and in part of the frame region F outside the grounding wire 23, i.e., in the buffer region B, effective circuits which contribute to the display such as drive circuits are not arranged so that the display region D is not affected by corrosion and/or break, but the electrostatic protection element 25 which does not contribute to display and avoids ESD that may occur in the manufacturing process and the gate electrode line 14b constituting the electrostatic protection element 25 can effectively be arranged. When the amount of charge accumulated in the gate electrode line 14b exceeds a predetermined level in fabricating the active matrix substrate 20a, due to, for example, charge generated in the etching step and static charge generated in the rubbing step, the charge is emitted to the grounding wire 23 through the semiconductor layer 12a of the electrostatic protection element 25, and therefore ESD can be avoided. Thus, both avoiding ESD and narrowing the frame region can be achieved.

According to the active matrix substrate 20a of the present embodiment, the grounding wire 23 includes the discharge projections 23a projecting toward the gate electrode line 14b. Therefore, the charge accumulated in the gate electrode line 14b in the fabrication process (the active matrix substrate fabrication process) due to, for example, charge generated in the etching step and static charge generated in the rubbing step, can be emitted by discharge that occurs at the pointed ends of the discharge projections 23a through the interlayer insulating film.

According to the active matrix substrate 20a of the present embodiment, the gate driver 21 is arranged in part of the frame region F on the side of the grounding wire 23 close to the display region D. Therefore, a distance between the gate electrode line 14b constituting the electrostatic protection element 25 and the gate driver 21 is increased as compared with the case where the gate electrode line 114b is arranged in part of the frame region F inside the common wire 123 (see the active matrix substrate 120 of FIG. 8). Thus, the gate driver 21 can be less likely to be affected by static electricity.

Embodiment 2

Figure 6:
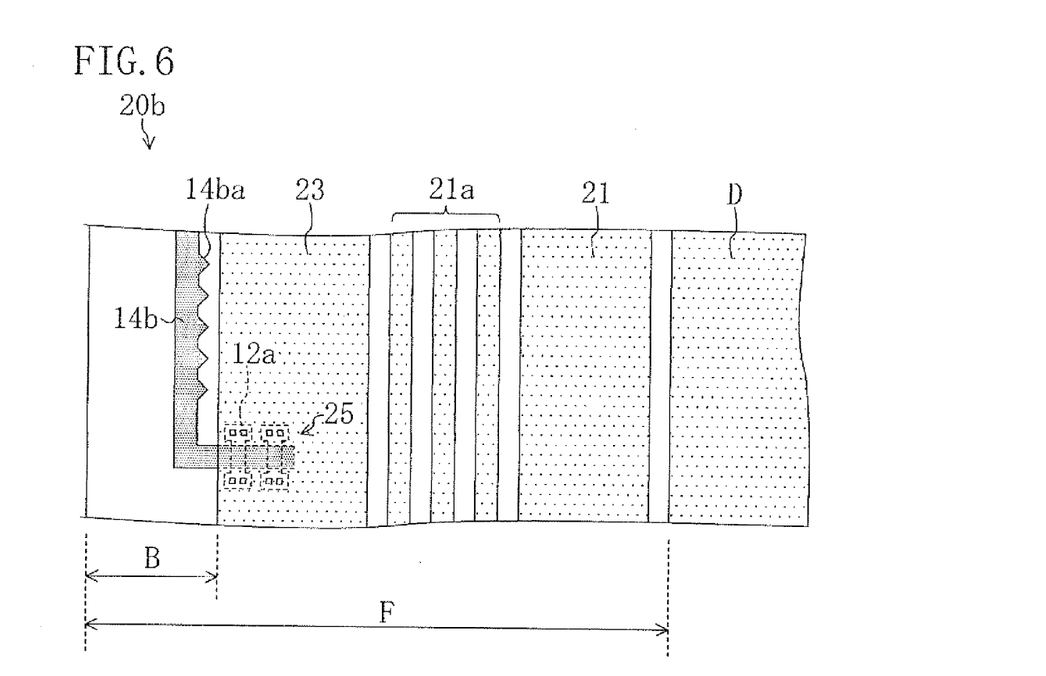
FIG. 6 is a plan view illustrating a frame region F of an active matrix substrate 20b constituting a liquid crystal display panel according to Embodiment 2.

FIG. 6 is a plan view illustrating a frame region F of an active matrix substrate 20b of the present embodiment. In the following embodiments, the same components as those shown in FIGS. 1 to 5 are indicated by the same reference numerals to omit detailed explanation.

In Embodiment 1, the discharge projections 23a are integrated with the grounding wire 23. However, in this embodiment, discharge projections 14ba are integrated with the gate electrode line 14b as shown in FIG. 6. Therefore, for example, when the charge is accumulated in the gate electrode line 14b in fabricating the active matrix substrate due to, for example, charge generated in the etching step and static charge generated in the rubbing step, the charge can be emitted by discharge that occurs at the pointed ends of the discharge projections 14ba through the interlayer insulating film 15. The active matrix substrate 20b can be fabricated in the same manner as the fabrication process of the active matrix substrate 20a described in Embodiment 1 except that the gate electrode line 14b and the grounding wire 23 are patterned into different shapes. Therefore, the detailed explanation is omitted.

Embodiment 3

Figure 7:
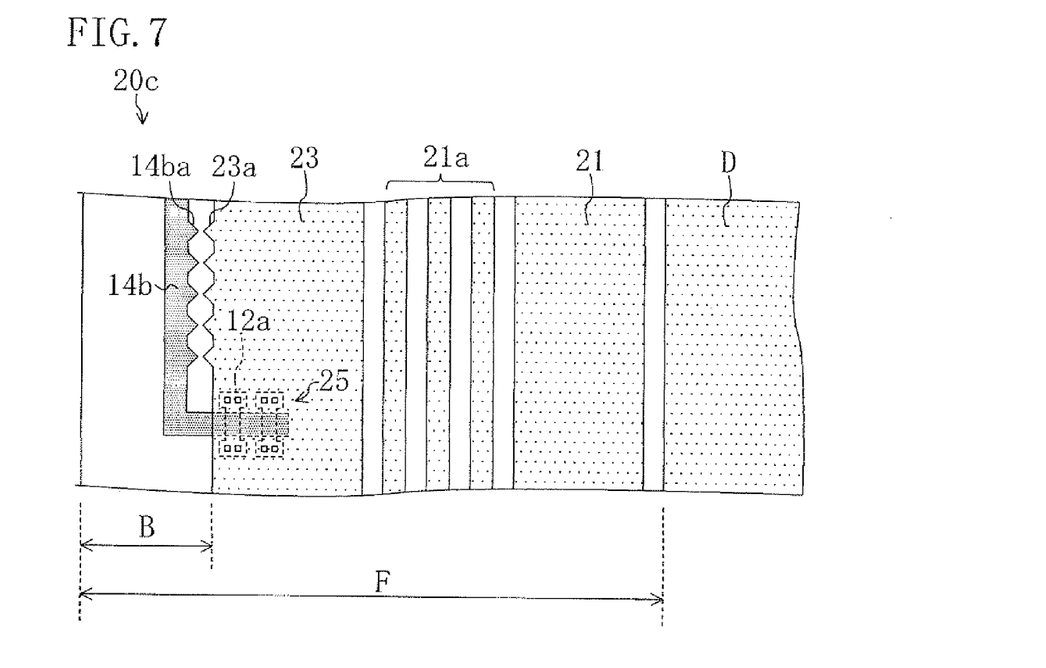
FIG. 7 is a plan view illustrating a frame region F of an active matrix substrate 20c constituting a liquid crystal display panel according to Embodiment 3.

FIG. 7 is a plan view illustrating a frame region F of an active matrix substrate 20c of the present embodiment.

In the above-described embodiments, the discharge projections 14ba or 23a are formed. However, in this embodiment, both of the discharge projections 14ba and 23a are formed as shown in FIG. 7. Therefore, for example, when the charge is accumulated in the gate electrode line 14b in fabricating the active matrix substrate due to, for example, charge generated in the etching step and static charge generated in the rubbing step, the charge can be emitted by discharge that occurs at the pointed ends of the discharge projections 14ba and 23a through the interlayer insulating film 15.

In Embodiments 1 to 3, the active-matrix-drive liquid crystal display panel 50 is taken as an example of the display panel. However, the present invention is also applicable to other display panels, such as EL (electroluminescence) display panels and passive-matrix-drive display panels.

INDUSTRIAL APPLICABILITY

As described above, the present invention makes it possible to achieve both avoiding ESD and narrowing the frame region. Therefore, the invention is useful for display devices applied to mobile devices in which the narrowed frame region is required, such as cellular phones.

The invention claimed is:

1. An active matrix substrate including a display region which contributes to display and a frame region which is arranged outside the display region and does not contribute to the display, the active matrix substrate comprising:
   a grounding wire extending along a circumference of the frame region in the frame region,
   a gate driver being located inside the grounding wire so that the gate driver is located closer to the display region than is the grounding wire,
   wherein a gate electrode line, part of which overlapping the grounding wire to form at least part of an electrostatic protection element, is arranged in part of the frame region outside the grounding wire, and
   wherein the gate driver is located between the display region and the grounding wire as viewed from above.

2. The active matrix substrate of claim 1, wherein the grounding wire and the gate electrode line of the electrostatic protection element are electrically connectable through a semiconductor layer.

3. The active matrix substrate of claim 1, wherein the grounding wire is electrically connected to a common electrode of a counter substrate arranged to face the active matrix substrate.

4. The active matrix substrate of claim 1, wherein the grounding wire has a discharge projection projecting toward the gate electrode line.

5. The active matrix substrate of claim 1, wherein the gate electrode line has a discharge projection projecting toward the grounding wire.

6. The active matrix substrate of claim 1, wherein a driver circuit is arranged in part of the frame region on the side of the grounding wire close to the display region.

7. The active matrix substrate of claim 1, wherein the part of the frame region outside the grounding wire is a buffer region which prevents the display region from being affected by corrosion and/or break.

8. A display panel comprising:
   an active matrix substrate;
   a counter substrate which is arranged to face the active matrix substrate and has a common electrode; and
   a display layer inserted between the active matrix substrate and the counter substrate,
   the display panel defining a display region which contributes to display and a frame region which is arranged outside the display region and does not contribute to display, and
   the active matrix substrate including a grounding wire extending along a circumference of the frame region and electrically connected to the common electrode of the counter substrate,
   wherein an electrode line, part of which overlapping the grounding wire to form part of an electrostatic protection element, is arranged in part of the frame region outside the grounding wire, wherein a majority of the electrode line is located outside the display region and outside the grounding wire, and wherein opposing end portions of the electrode line overlap the grounding wire,
   a gate driver located inside the grounding wire so that the gate driver is located closer to the display region than is at least a portion of the grounding wire, and
   wherein the gate driver is located between the display region and the grounding wire as viewed from above.

9. The display panel of claim 8, wherein the electrode line is a gate electrode line.

* * * * *